Figure 1:
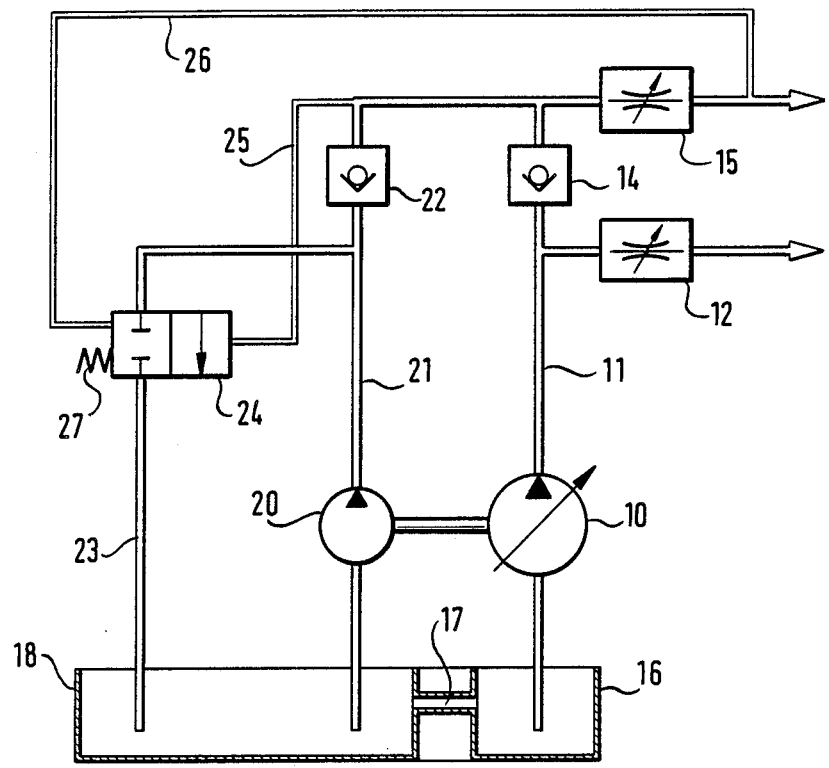

United States Patent [19]

Kauss et al.

[11] Patent Number: 4,712,375
[45] Date of Patent: Dec. 15, 1987

[54] SAFETY DEVICE FOR PRIORITY HYDRAULIC CONSUMER

[75] Inventors: Wolfgang Kauss, Lohr-Wombach; Norbert Mucheyer, Rechtenbach, both of Fed. Rep. of Germany

[73] Assignee: Mannesmann Rexroth GmbH, Fed. Rep. of Germany

[21] Appl. No.: 849,471

[22] Filed: Apr. 8, 1986

[30] Foreign Application Priority Data

Apr. 18, 1985 [DE] Fed. Rep. of Germany ....... 3513967

[51] Int. Cl.$^4$ ............................................. F16D 31/02
[52] U.S. Cl. ....................................... 60/405; 60/422; 91/516
[58] Field of Search ................... 91/516; 60/403, 405, 60/422

[56] References Cited

U.S. PATENT DOCUMENTS

| | | | |
|---|---|---|---|
| 3,535,877 | 10/1970 | Becker et al. | 60/422 |
| 3,896,618 | 7/1975 | Smith et al. | 60/405 |
| 3,994,133 | 11/1976 | Pfeil et al. | 91/516 X |
| 4,121,501 | 10/1978 | Finley | 91/519 |
| 4,453,451 | 6/1984 | Streeter et al. | 91/516 X |

Primary Examiner—William E. Wayner
Attorney, Agent, or Firm—Harness, Dickey & Pierce

[57] ABSTRACT

In the supply of priority and lower-ranking consumers the flow to the priority consumer must be maintained even when there is a leak in the hydraulic system of the lower-ranking consumers. For this purpose the priority consumer is connected via in each case a check valve to a pump and an auxiliary pump. If the pressure generated by the pump drops for example due to a leak a valve opening the pressure line to the discharge is shut-off and the priority consumer thereby supplied with fluid delivered by the auxiliary pump.

6 Claims, 2 Drawing Figures

SAFETY DEVICE FOR PRIORITY HYDRAULIC CONSUMER

DESCRIPTION

The invention relates to a safety device for priority hydraulic consumers, in particular for the power steering system of agricultural tractors and working implements, having the features set forth in the preamble of claim 1.

It is known to arrange in the pressure line to the lower-ranking consumer a priority valve which is constructed as pressure balance, the pressure difference occurring at the steering valve, i.e. the priority consumer, acting upon the control piston of the priority valve in such a manner that with increasing power requirement of the steering the supply of fluid to the lower-ranking consumer is throttled.

Should a leak occur in the region of the lower-ranking consumer in the hydraulic system failure of the piority consumer is to be avoided under all circumstances.

It has already been proposed (No. P 34 32 159) to actuate the priority valve by means of a switching valve which is switched by a pickup measuring the oil level in the reservoir. If the oil level drops the valve is switched to the current-less state and the lower-ranking consumer disconnected from the priority valve so that the power steering system continues to be supplied with working medium.

To avoid failure of the steering the power steering system can also be connected to a separate auxiliary pump which is either supplied with fluid from a separate reservoir or the suction connection of which is disposed in the common reservoir lower than the suction connection of the pump supplying the lower-ranking consumers. If the fluid level in the reservoir drops firstly the supply to the lower-ranking consumers is interrupted whilst the steering is further supplied with working medium via the auxiliary pump.

The problem underlying the invention resides in constructing a safety device of the aforementioned type in the simplest and operationally most reliable manner.

Said problem is solved according to the invention by the features set forth in the characterizing clause of claim 1.

Although the solution according to the invention utilizes an auxiliary pump the latter is made relatively small. In particular, the throughput design is chosen so that certain minimum requirements can just be met. As a result, the displacement is relatively small so that overall size, costs and tubing expenditure can be kept within limits. It is particularly advantageous that a priority valve can be dispensed with. In the normal operating case the pump supplies the priority consumer, in particular a power steering system, and the lower-ranking consumers. Via the pressure balance the valve associated with the auxiliary pump is open towards the tank so that the auxiliary pump is connected to pressureless circulation. Should the pressure delivered by the pump no longer be adequate because the lower-ranking consumers are taking up too much working medium or a leak has occurred in the lower-ranking system, by the pressure drop in the pressure line of the pump the pressure balance is switched over and the discharge to the tank shut off so that the priority consumer is now supplied by the auxiliary pump.

Figure 2:
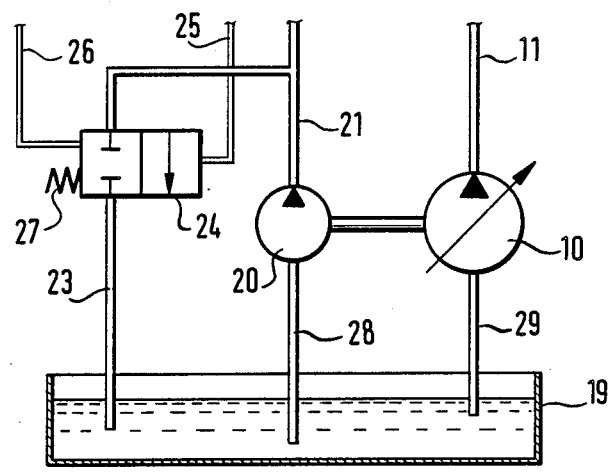

Examples of embodiment of the invention will be explained in detail hereinafter with the aid of the drawings, wherein:

FIG. 1 is a schematic illustration of the safety device with separate reservoirs and FIG. 2 is a partial view of FIG. 1 with a common reservoir.

In FIG. 1 a control pump 10 of adjustable displacement supplies via a pressure line 11 at least one lower-ranking consumer 12 and via a check valve 14 a priority consumer 15, for example a power steering system. The control pump 10 sucks fluid from a reservoir 16.

Coupled to the control pump 10 is an auxiliary pump 20 which from a separate reservoir 18 delivers fluid to a pressure line 21 and via a check valve 22 supplies the priority consumer 15. Disposed in a line 23 leading to the reservoir 18 is a 2/2 way valve 24. The valve 24 is subjected in the manner of a pressure balance to the pressure difference occurring at the priority consumer 15. For this purpose control pressure lines 25 and 26 are provided which are connected upstream and downstream of the consumer 15 respectively. A spring 27 acts in the same sense as the pressure in the control pressure line 26 on the control piston of the valve 24. The two reservoirs 16 and 18 are connected together via an overflow line 17.

The overall size of the auxiliary pump 20 and the associated reservoir 18 are chosen such that the pressure and displacement are sufficient only for the priority consumer 15. All tank lines associated with the priority consumer open into the reservoir 18.

The mode of operation is as follows: In the normal operating case the pressure generated by the control pump 10 in the pressure line 11 is so high that via the control pressure line 25 the valve 24 moves to the open position and the auxiliary pump 20 is thus switched to pressure-less circulation. The check valve 22 prevents the displacement delivered by the control pump 10 from flowing off via the valve 24 to the tank 18.

If due to a connected lower-ranking consumer 12 the pressure delivered by the control pump 10 does not suffice to supply the priority consumer adequately with fluid, the pressure in the control pressure line 25 drops and the valve 24 is connected to the shutoff position. The auxiliary pump 20 thus supplies the priority consumer 15 via the opening check valve 22. The check valve 14 prevents a flow of fluid from the auxiliary pump 20 to the lower-ranking consumer 12.

If due to a leak in the hydraulic system of the lower-ranking consumer 12 the pressure of the control pump 10 breaks down, the supply of the priority consumer 15 is again effected by the auxiliary pump 20.

FIG. 2 shows a joint reservoir 19 for both pumps 10 and 20. The suction line 28 of the auxiliary pump 20 is lower than the suction line 29 of the control pump 10. When a leak occurs in the hydraulic system of the lower-ranking consumer the control pump 10 sucks in air so that the pressure in the pressure line 11 breaks down and the auxiliary pump 20 supplies the priority consumer 15 with fluid.

We claim:

1. A safety device in a system having a priority consumer and a lower ranking consumer comprising a pump having a pressure line and a suction communicating with a source and an auxillary pump having a pressure line and a suction line communicating with a source, the improvement comprising means communicating said pump pressure line to said lower ranking consumer and to said priority consumer through a first check valve, means communicating said auxiliary pump pressure line with said priority consumer through a second check valve, and valve means responsive to the pressure applied to said priority consumer for communicating said auxiliary pump pressure line to its source when the pressure applied to said priority consumer is above a predetermined value and for closing the communication of said auxiliary pump pressure line to its source when the pressure applied to said priority consumer is less than said predetermined value.

2. Safety device according to calim 1 characterized in that the valve in the manner of a pressure means is responsive to the pressure difference occurring at the priority consumer.

3. Safety device according to claim 1 characterized in that for the auxiliary pump source comprises a tank and the pump source comprises a reservoir and further including an overflow line connecting said tank to said reservoir.

4. Safety device according to claim 1 characterized in that for the source for the auxiliary pump and for the pump comprise a joint tank the suction line of said pump is arranged in said joint tank higher than the suction line of said auxiliary pump.

5. Safety device according to claim 2 characterized in that for the auxiliary pump source comprises a tank and the pump source comprises a reservoir and further including an overflow line connecting said tank to said reservoir.

6. Safety device according to claim 2 characterized in that for the source for the auxiliary pump and for the pump comprise a joint tank the suction line of said pump is arranged in said joint tank higher than the suction line of said auxiliary pump.

* * * * *